(12) United States Patent
Iizuka et al.

(10) Patent No.: US 8,905,007 B2
(45) Date of Patent: Dec. 9, 2014

(54) INTERNAL COMBUSTION ENGINE

(75) Inventors: Motomasa Iizuka, Anjo (JP); Kimitaka Saito, Nagoya (JP); Hisashi Iida, Kariya (JP)

(73) Assignee: Denso Corporation, Kariya (JP)

( * ) Notice: Subject to any disclaimer, the term of this patent is extended or adjusted under 35 U.S.C. 154(b) by 312 days.

(21) Appl. No.: 13/471,636

(22) Filed: May 15, 2012

(65) Prior Publication Data

US 2012/0291761 A1 Nov. 22, 2012

(30) Foreign Application Priority Data

May 16, 2011 (JP) ................................. 2011-109044

(51) Int. Cl.
*F01P 3/20* (2006.01)

(52) U.S. Cl.
USPC .............................. 123/536; 60/300; 60/302

(58) Field of Classification Search
USPC ............................. 123/536, 538; 60/272–324
IPC ......... F01N 3/28,3/2882, 13/10, 5/02, 2240/02; F02M 27/02; F02B 51/02
See application file for complete search history.

(56) References Cited

U.S. PATENT DOCUMENTS 2,632,296 A * 3/1953 Houdry ............................ 60/772
4,125,090 A * 11/1978 Masunaga et al. ................. 123/3
4,651,703 A * 3/1987 Hoppie ........................... 123/551
8,353,154 B2 * 1/2013 Jacques et al. ................... 60/302
8,612,117 B2 * 12/2013 Senda et al. .................... 701/103

FOREIGN PATENT DOCUMENTS

| JP | 57-123908 | 1/1981 |
| JP | 3-145518 | 6/1991 |
| JP | 8-296447 | 11/1996 |
| JP | 2001-173446 | 6/2001 |
| JP | 2001-227330 | 8/2001 |
| JP | 2005-048733 | 2/2005 |
| JP | 2008-002376 | 1/2008 |
| JP | 2008-184934 | 8/2008 |
| JP | 2008-190439 | 8/2008 |
| JP | 2011-106320 | 6/2011 |

OTHER PUBLICATIONS

Office Action (2 pages) dated Jan. 28, 2014 issued in corresponding Japanese Application No. 2011-109044 and English translation (2 pages).

* cited by examiner

*Primary Examiner* — M. McMahon
(74) *Attorney, Agent, or Firm* — Nixon Vanderhye PC

(57) ABSTRACT

An internal combustion engine is provided with a heat-generation chamber disposed so as to be adjacent to a combustion chamber, a heat-generation chamber valve capable of setting up either a communicating state or a shut-down state between the heat-generation chamber and the combustion chamber, and a heat-recovery pipe for recovering heat of a gas guided into the combustion chamber and utilizing the heat as recovered for warm-up. The heat-generation chamber is provided with a heat-generation-chamber spark plug. A catalytic unit is provided between the heat-generation-chamber spark plug and the heat-recovery pipe.

5 Claims, 8 Drawing Sheets

INTERNAL COMBUSTION ENGINE

CROSS-REFERENCE TO RELATED APPLICATION

This application is based on Japanese Patent Application No. 2011-109044 filed on May 16, 2011, the disclosure of which is incorporated herein by reference.

TECHNICAL FIELD

The present invention relates to an internal combustion engine that is effective for early warm-up.

BACKGROUND

An internal combustion engine takes out the chemical reaction energy (thermal energy) of a fuel as kinetic energy. In such an internal combustion engine, gasoline, light oil, and so forth are used as a fuel. When gasoline is used as the fuel, the cycle of the internal combustion engine is "Otto-Cycle". A number of technologies for expanding a positive work portion (a shaded area in FIG. 8) on a PV diagram, from a compression stroke to a combustion stroke during the Otto-cycle, have been developed (for example, JP-H8-296447A).

However, the related art technologies for expanding the positive work portion have following matters (1) to (3) to be overcome:

(1) Since an internal combustion engine body, a cooling water, and a lubricating oil are low in temperature at the time of cold start, a frictional force (at, for example, a sliding contact part between a piston and a cylinder) of an internal combustion engine is large. A fuel combustion may become unstable, so that fuel economy may be deteriorated and emission gas may increase;

(2) In a case where an internal combustion engine is mounted in an automobile, heating speed of passenger's compartment at the cold start is relatively low; and (3) In an idle reduction control vehicle and a hybrid vehicle using a motor and an engine, the advantageous effects thereof cannot be fully exhibited before warm-up of the engine.

SUMMARY

It is an object of the present disclosure to provide an internal combustion engine capable of improving its fuel economy, reducing emitted hazardous gas, and improving its driving comfort.

An internal combustion engine includes a cylinder, a piston, a power output unit coupled to the piston, a combustion chamber, a spark plug disposed in the combustion chamber, an intake valve; and an exhaust valve. The internal combustion engine further includes a heat-generation chamber adjacent to the combustion chamber, a heat-generation chamber valve capable of setting up either a communicating state or a shut-down state between the heat-generation chamber and the combustion chamber, and a heat-generation-chamber heat-recovery unit for recovering heat of a gas in the heat-generation chamber to thereby utilize the heat as recovered for warming up.

Further, the internal combustion engine is further provided a HC (hydrocarbon) purification unit for oxidizing hydrocarbons contained in the combustion gas and a purification unit heat-recovery sub-unit provided adjacent to the HC purification unit, for conducting a heat exchange between heat generated by the oxidation of the combustion gas and heat of an engine cooling water, thereby recovering heat generated in the HC purification unit The internal combustion engine described as above is provided with the heat-generation chamber that is adjacent the combustion chamber. When the heat-generation chamber valve is opened communicate between the heat-generation chamber and the combustion chamber, the combustion gas is introduced into the heat-generation chamber, in which the heat is recovered by the heat-generation-chamber heat-recovery unit. Further, since heat is recovered with the compression in an extremely low state, most of thermal energy generated due to combustion will not be converted into kinetic energy, so that heat recovery efficiency is enhanced. As a result, warm-up time can be shortened.

Further, the engine is provided with the HC purification unit and the purification unit heat-recovery unit, which contribute to enhancement in the heat recovery efficiency. More specifically, in a case where the air-fuel mixture is combusted in the combustion chamber, it is not possible to fully burn the air-fuel mixture. Unburned hydrocarbons are contained in the combustion gas. Accordingly, in the present disclosure, the engine is provided with the HC purification unit for oxidizing the unburned hydrocarbons contained in the combustion gas. When the unburned hydrocarbons contained in the combustion gas is oxidized, heat is generated at the time of the oxidation as well. This heat is recovered by the purification unit heat-recovery unit provided so as to be adjacent to the HC purification unit. As a result, the heat recovery efficiency is further enhanced.

BRIEF DESCRIPTION OF THE DRAWINGS

The above and other objects, features and advantages of the present disclosure will become more apparent from the following detailed description made with reference to the accompanying drawings. In the drawings.

DETAILED DESCRIPTION

Figure 1:
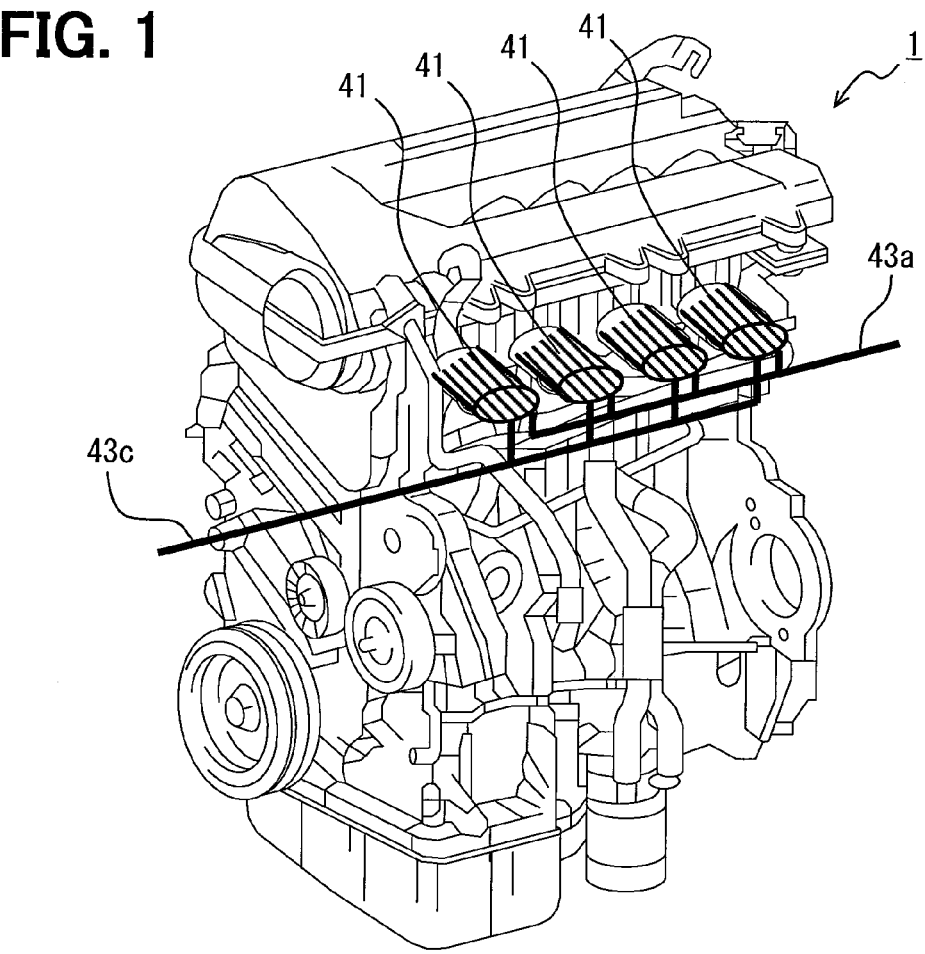
FIG. 1 is a perspective view schematically showing a general construction of an internal combustion engine according to an embodiment of the invention.
Figure 2:
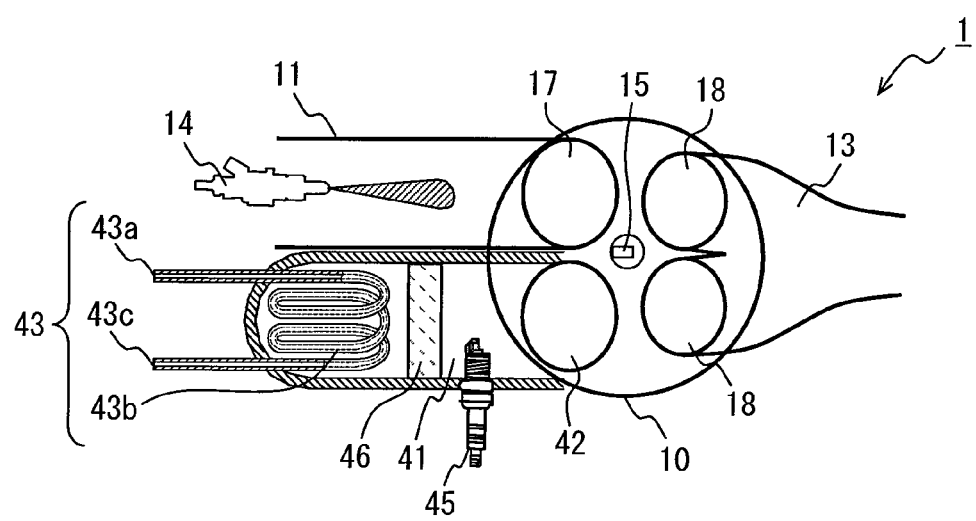
FIG. 2 is a plan view schematically showing a planar construction of the internal combustion engine.
Figure 3:
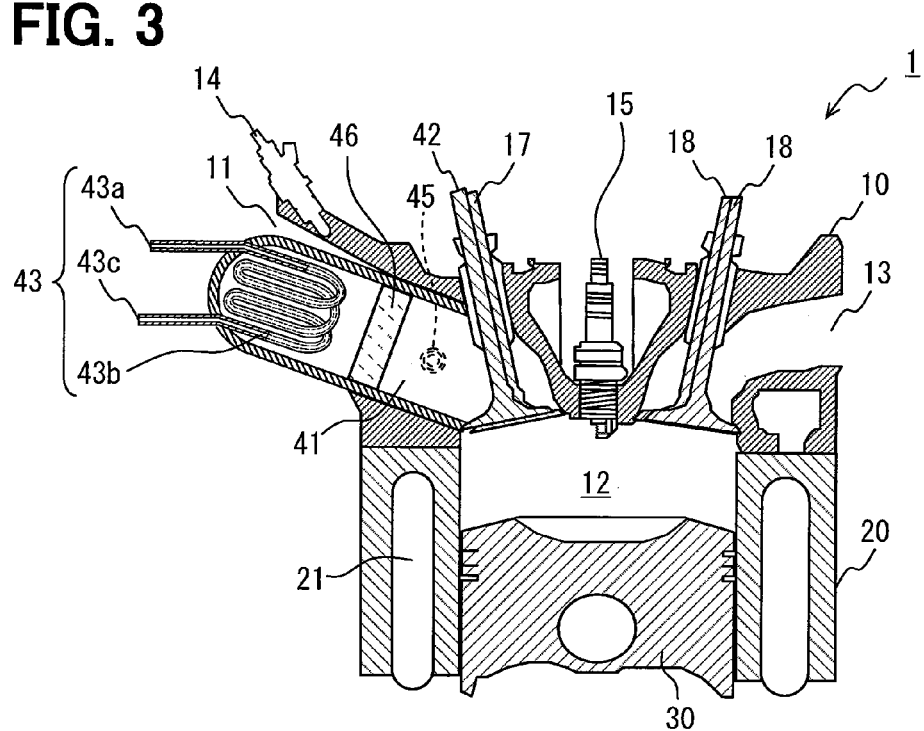
FIG. 3 is a side view schematically showing a side construction of the internal combustion engine.

An internal combustion engine 1 according to one embodiment of the invention is described hereinafter with reference to FIGS. 1 to 11. FIG. 1 is a perspective view schematically showing a general construction of the internal combustion engine 1. FIG. 2 is a plan view schematically showing a planar construction of the internal combustion engine 1, and FIG. 3 is a side view schematically showing a side construction of the internal combustion engine 1. First, a construction of the internal combustion engine 1 is described with reference to FIGS. 1 to 3. The internal combustion engine 1 according to the present embodiment is mounted on a vehicle (not shown).

The internal combustion engine 1 includes a plurality of cylinders. Each of the cylinders is configured to perform the Otto-Cycle. Further, the respective cylinders include a heat-generation chamber 41, a heat-generation chamber valve 42, a valve drive system, and a heat-recovery pipe 43, as described later. Also, the internal combustion engine 1 is configured to perform a new cycle (a heat-recovery mode as described later).

The internal combustion engine 1 is comprised of an engine head 10, and an engine block 20, as shown in FIG. 3. In the respective cylinders of the engine head 10, there are formed an intake port 11 for introducing fresh air, a combustion chamber 12, and an exhaust port 13 for discharging a combustion gas. The combustion chamber 12 is defined by a sidewall of the cylinder and the top surface of a piston 30 that is disposed in the cylinder so as to be reciprocatively movable.

The intake port 11 is connected to an intake passage (not shown). An intake air temperature sensor for detecting the temperature of the air in the intake passage, and an air-flow meter for detecting an air-flow rate taken into the intake port 11 are disposed in the intake passage. The exhaust port 13 is connected to an exhaust passage (not shown). An air-fuel ratio sensor for detecting an air-fuel ratio of the air-fuel mixture subjected to the combustion in the combustion chamber 12 on the basis of an oxygen content of an exhaust gas flowing inside the exhaust passage is disposed in the exhaust passage, and a catalytic device is disposed downstream of the air-fuel ratio sensor.

A fuel injector 14 is disposed in the intake port 11 of the engine head 10. An electronic control unit (ECU) 50 computes a fuel injection timing, a fuel injection quantity based on outputs from the air flow meter, the intake air temperature sensor, the air-fuel ratio sensor, a water temperature sensor, and information on an engine operation mode, (engine output mode or heat-recovery mode is selected). The fuel injector 14 may be disposed on the sidewall of the cylinder of the engine block 20, and the fuel may be supplied directly into the combustion chamber 12.

A spark plug 15 generating a spark in order to ignite the air-fuel mixture is disposed in the combustion chamber 12 of the engine head 10. An ignition timing of the spark plug 15 is computed by the ECU 50.

An intake valve 17 is disposed between the intake port 11 and the combustion chamber 12. The intake valve 17 is driven by a rocker arm cam. The intake valve 17 fluidly connects or disconnects between the intake port 11 and the combustion chamber 12.

An exhaust valve 18 is disposed between the combustion chamber 12 and the exhaust port 13. The exhaust valve 18 is driven by a rocker arm cam. The exhaust valve 18 fluidly connects or disconnects between the combustion chamber 12 and the exhaust port 11.

A water jacket 21 is formed in the engine block 20. A coolant temperature sensor for detecting the temperature of engine coolant flowing through the water jacket 21 is disposed in the water jacket 21.

The piston 30 is coupled to a crank shaft (not shown) in such manner as to reciprocatively slide inside of the cylinder. A reciprocating motion of the piston 30 is converted into a rotary motion thereof by the crank shaft, and kinetic energy is outputted to the outside of the internal combustion engine 1. The crank shaft corresponds to a power output unit.

The piston 30 reciprocatively slides inside of the cylinder receiving a combustion energy in a case of the engine output mode. Meanwhile, the piston 30 reciprocatively slides inside of the cylinder by a starter motor in a case of the heat-recovery mode. It should be noted that a dedicated motor for use in driving the piston 30 may be provided, and the piston 30 may be caused to reciprocatively move inside of the cylinder by the dedicated motor. Otherwise, in a case where the internal combustion engine 1 is mounted in a hybrid vehicle using a motor and an internal combustion engine, the piston 30 may be caused to reciprocatively move inside of the cylinder by the hybrid motor. Alternatively, in a case where the plural cylinders include a cylinder provided with the combustion chamber 12 and a cylinder not provided with the combustion chamber 12, the piston 30 of the cylinder provided with the combustion chamber 12 may be caused to reciprocatively move inside of the cylinder by the crank shaft of the cylinder not provided with the combustion chamber 12. An autonomous operation may be enabled.

The heat-generation chamber 41 is formed in the engine head 10 in such a way as to be adjacent to the combustion chamber 12 and the intake port 11. The heat-generation chamber valve 42 is disposed in the engine head 10. The heat-generation chamber valve 42 is driven by the rocker arm type cam. The heat-generation chamber valve 42 fluidly connects or disconnects between the combustion chamber 12, and the heat-generation chamber 41. A volume of the heat-generation chamber 41 is preferably set to 0.5 to 2.0 times of the cylinder volume.

One end of the heat-generation chamber 41, which is adjacent to the heat-generation chamber valve 42, is open, and the other end thereof is closed. The heat-generation chamber 41 is in a shape of a cylinder of which axial length is longer than an inner diameter. Further, the heat-generation chamber 41 is disposed such that the axis thereof is in parallel with the axis of the intake port 11. A heat-recovery pipe 43 serving as a channel of a heat-recovery water is disposed at the end of the heat-generation chamber 41. The heat-recovery pipe 43 functions as a heat-generation-chamber heat-recovery unit, and also functions as a purification-unit heat-recovery unit. The heat-recovery pipe 43 is comprised of an inlet-side heat-recovery pipe 43a, a heat exchange unit 43b, and an outlet-side heat-recovery pipe 43c. The inlet-side heat-recovery pipe 43a and the outlet-side heat-recovery pipe 43c penetrate through the wall of the heat-generation chamber 41. Further, the inlet-side heat-recovery pipe 43a, and the outlet-side heat-recovery pipe 43c are connected to the water jacket 21. Meanwhile, the heat exchange unit 43b is disposed in the heat-generation chamber 41 to be formed so as to be spiral in shape. The heat exchange unit 43b in the heat-generation chamber 41 is rendered slightly shorter than about half the axial length of the heat-generation chamber 41.

Further, a heat-generation-chamber spark plug 45 is disposed at a position relatively close to the heat-generation chamber valve 42, in the heat-generation chamber 41. More specifically, the heat-generation-chamber spark plug 45 is disposed at a position relatively close to the heat-generation chamber valve 42, on the cylindrical wall of the heat-generation chamber 41, such that the tip (a spark generation part) thereof penetrates substantially and vertically through the cylindrical wall so as to be positioned inside of the heat-generation chamber 41. A combustion gas resulting from combustion in the combustion chamber 12 is guided into the heat-generation chamber 41, as described later. However, unburned hydrocarbons are contained in the combustion gas. When a spark is generated by the heat-generation-chamber spark plug 45, the unburned hydrocarbons are almost combusted.

However, a part of the hydrocarbons will remain unburned even after the spark is generated by the heat-generation-chamber spark plug 45. In order to oxidize the unburned hydrocarbons, a catalytic unit 46 is disposed inside of the heat-generation chamber 41, adjacent to the heat-recovery pipe 43. The catalytic unit 46 is structured such that a catalyst material, such as platinum, is carried in a carrier such as a porous ceramic. The catalytic unit 46 corresponds to an HC purification unit.

As described above, the catalytic unit 46 is disposed at the position adjacent to the heat-recovery pipe 43. It should be noted that "adjacent" in this case is meant by "away substantially at a distance allowing heat generated in the catalytic unit 46 to be efficiently conveyed to the heat-recovery pipe 43". Such a distance is set as appropriate depending on heat recovery efficiency as required. It can be said that if the catalytic unit 46 is disposed inside the heat-generation chamber 41 like the present embodiment, the catalytic unit 46 is "adjacent" to the heat-recovery pipe 43 wherever the catalytic unit 46 is positioned inside the heat-generation chamber 41. Further, the catalytic unit 46 is disk-like in external shape in such a way as to stop up the heat-generation chamber 41 in the axial direction thereof. However, the catalytic unit 46 is not necessarily like this in shape and size, and may be of such a size as the heat-recovery pipe 43 can be communicated with the heat-generation chamber spark plug 45.

The heat-recovery pipe 43 recovers heat from the combustion gas of which temperature has risen due to the combustion in the combustion chamber 12, followed by further rise in temperature due to combustion caused by the sparks of the heat-generation-chamber spark plug 45 in the heat-generation chamber 41, before further rise in temperature due to oxidation caused by the catalytic unit 46. In the case where there is the need for warming-up the internal combustion engine 1 at the time of the cold start, the heat-recovery water low in temperature flows from the water jacket 21 through the inlet-side heat-recovery pipe 43*a* into the heat exchange unit 43*b*. A heat exchange is conducted between the heat-recovery water low in temperature and the combustion gas guided into the heat-generation chamber 41, whereby the heat-recovery water becomes higher in temperature and flows through the outlet-side heat-recovery pipe 43*c* toward the water jacket 21. Then, the internal combustion engine 1 is warmed up by the cooling water in the water jacket 21, which is turned higher in temperature. Thus, the heat-recovery water is utilized for warming up of the internal combustion engine 1.

In the present embodiment, the heat exchange unit 43*b* is formed so as to be spiral in shape. The shape of the heat exchange unit 43*b* is not limited thereto. The shape is optional as long as the heat exchange between the heat-recovery water and the gas can be conducted in the heat-generation chamber 41.

Figure 4:
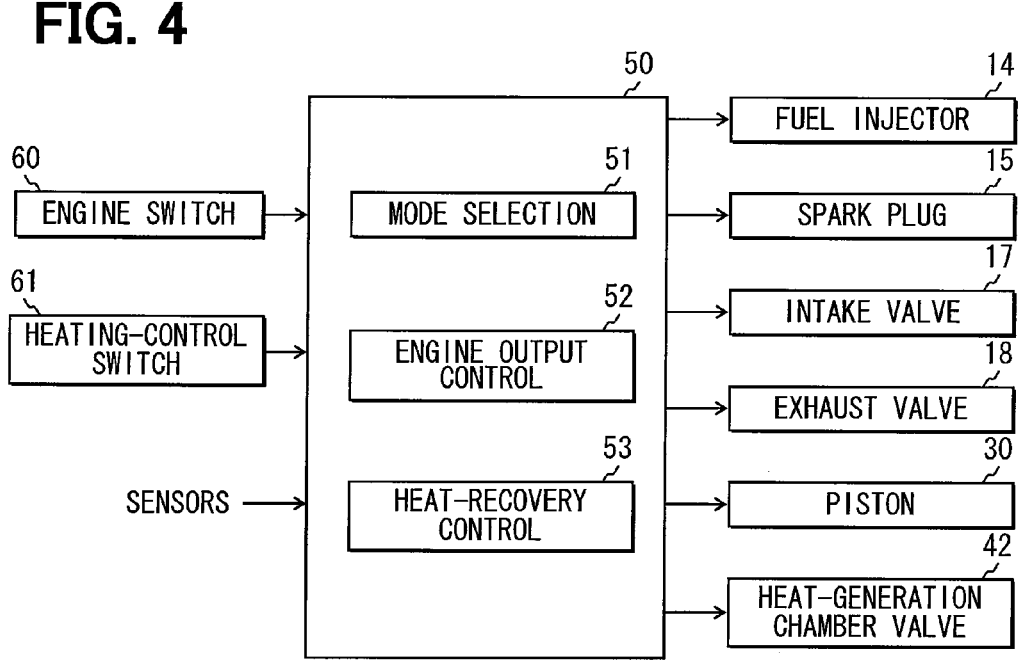
FIG. 4 is a block diagram showing a configuration example of a controller for controlling the internal combustion engine.

FIG. 4 shows a configuration of the ECU 50. The ECU 50 includes a microcomputer which executes a various control programs stored in a ROM. Specifically, the ECU 50 includes a mode selection unit 51, an engine-output control execution unit 52, and a heat-recovery control execution unit 53.

The ECU 50 is electrically connected to an engine switch 60, a heating-control switch 61, and various sensors, respectively. The engine switch 60 is a well-known push-button switch for instructing the internal combustion engine 1 to start. The heating-control switch 61 is a push-button switch for giving a request for heating the passenger's compartment. The various sensors include the intake air temperature sensor, the air-fuel ratio sensor, the water temperature sensor and so forth.

The ECU 50 is electrically connected to the fuel injector 14, thereby controlling a fuel injection quantity. Further, the ECU 50 is electrically connected to the spark plug 15, thereby controlling an ignition time of the air-fuel mixture in the combustion chamber 12. The ECU 50 is electrically coupled to the valve drive system, thereby controlling the valve opening of the intake valve 17, the exhaust valve 18, and the heat-generation chamber valve 42, respectively. Further, the ECU 50 is electrically coupled to the starter motor, thereby the piston 30 makes a reciprocating motion in the cylinder.

The mode selection unit 51 determines whether or not the internal combustion engine 1 need to be warmed up on the basis of an operation state of the internal combustion engine 1. Specifically, when the engine switch 60 is turned ON, the mode selection unit 51 determines whether or not an output value of the water temperature sensor is a predetermined threshold value, or lower, that is, a cooling water temperature of the internal combustion engine 1 is less than or equal to a predetermined temperature (for example, 60° C.).

If the cooling water temperature of the internal combustion engine 1 is less than or equal to the predetermined temperature when the engine switch 60 is turned ON, it represents that the engine switch 60 is turned ON in a state where the cooling water temperature is low after a specified time period has elapsed after a preceding stop of the internal combustion engine 1. Such a situation is referred to as a cold start of the internal combustion engine 1.

If the cooling water temperature of the internal combustion engine 1 is higher than the predetermined temperature when the engine switch 60 is turned ON, it represents that the engine switch 60 is turned ON in a state where the cooling water temperature is not low. The specified time has not elapsed after the preceding stop of the internal combustion engine 1.

Accordingly, when the mode selection unit 51 determines that the output value of the water temperature sensor is the predetermined threshold value or lower, the mode selection unit 51 determines that the internal combustion engine 1 needs to be warmed up, thereby the heat-recovery mode is selected. Meanwhile, when the mode selection unit 51 determines that the output value of the water temperature sensor is higher than the predetermined threshold value, the mode selection unit 51 determines that the internal combustion engine 1 needs not to be warmed up. Thus, thereby the engine output mode is selected.

In the present embodiment, when the engine switch 60 is turned ON, the mode selection unit 51 determines whether or not the sensor output value of the water temperature sensor is the predetermined threshold value or lower. Alternatively, if the heating-control switch 61 is turned ON in addition to the engine switch 60, or instead of ON-operation of the engine switch 60, the mode selection unit 51 may determine whether or not the sensor output value of the water temperature sensor is lower than or equal to the predetermined threshold value.

If the cooling water temperature of the internal combustion engine 1 is at the predetermined temperature or lower when the heating-control switch 61 is operated, it represents that a request for heating the compartment has been made in a state where the internal combustion engine 1 has not been warmed up as yet.

If the cooling water temperature of the internal combustion engine 1 is higher than the predetermined temperature when the heating-control switch 61 is operated, it represents that the request for heating has been made in a state where the internal combustion engine 1 has already been warmed up.

Accordingly, if it is determined that the cooling water temperature of the internal combustion engine 1 is at the predetermined temperature or lower, the mode selection unit 51 determines that the internal combustion engine 1 need to be warmed up for heating the compartment, thereby the heat-recovery mode is selected. Meanwhile, when it is determined that the sensor output value of the water temperature sensor exceeds the predetermined threshold value, the mode selection unit 51 determines that the internal combustion engine 1 needs not to be warmed, thereby the engine output mode is selected.

Further, in the present embodiment, it is determined whether or not the internal combustion engine 1 needs to be warmed up on the basis of the sensor output value of the water temperature sensor. However, this determination is not necessarily based on the sensor output value of the water temperature sensor. It may be determined whether or not the internal combustion engine 1 needs to be warmed up on the basis of the sensor output value of the intake air temperature sensor besides the sensor output value of the water temperature sensor. Alternatively, it may be determined whether or not the internal combustion engine 1 needs to be warmed up on the basis of an elapsed time from a preceding stop of the internal combustion engine 1.

In a case where the engine output mode is selected by the mode selection unit 51, the engine-output control execution unit 52 turns the heat-generation chamber valve 42 into a normally closed state by controlling the valve drive system. Thereby, one cycle is repeatedly executed. The one cycle is comprised of "the intake stroke", "the compression stroke", "the combustion stroke" and "the exhaust stroke" in this order.

Figure 5:
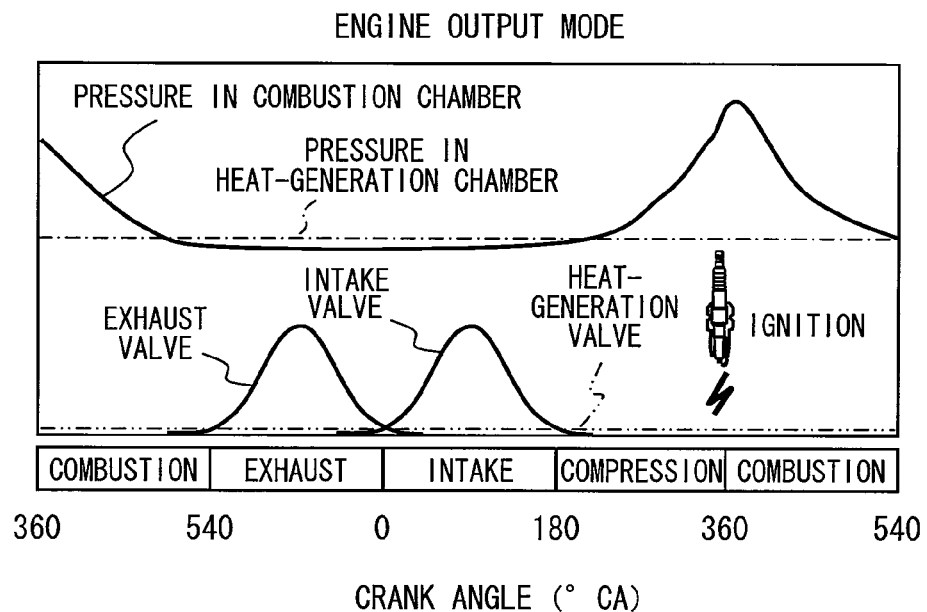
FIG. 5 is an operation view showing transitions in pressure inside a combustion chamber and pressure inside the heat-generation chamber in a case where an engine output mode is selected.

FIG. 5 is a chart showing transitions in a pressure in the combustion chamber 12, a pressure in the heat-generation chamber 41, a lift amount of the intake valve 17, a lift amount of the exhaust valve 18, and a lift amount of the heat-generation chamber valve 42, respectively, in a case where the engine output mode is selected. A cycle (Otto-Cycle) executed in the engine output mode will be described hereinafter.

The engine-output control execution unit 52 controls the valve drive system to turn the intake valve 17 and the exhaust valve 18 into a closed state, thereby starting the intake stroke. When the intake stroke is started, the engine-output control execution unit 52 controls the valve drive system so that the piston 30 slides down from the top dead center to the bottom dead center to open the intake valve 17. When the piston 30 slides down to open the intake valve 17, the air-fuel mixture in the intake port 11 is introduced into the combustion chamber 12. When the air-fuel mixture is introduced into the combustion chamber 12, the engine-output control execution unit 52 controls the valve drive system to close the intake valve 17, so that the intake stroke is completed.

Upon completion of the intake stroke, the engine-output control execution unit 52 starts the compression stroke. Specifically, the engine-output control execution unit 52 controls the valve drive system, so that the intake valve 17 and the exhaust valve 18 are kept closed. The piston 30 slides up from the bottom dead center to the top dead center while both the intake valve 17 and the exhaust valve 18 are kept closed. The air-fuel mixture in the combustion chamber 12 is compressed and the pressure in the combustion chamber 12 increases. When the piston 30 slides up to a point close to the top dead center (the crank angle at 360°), the engine-output control execution unit 52 completes the compression stroke.

After the completion of the compression stroke, the engine-output control execution unit 52 starts the combustion stroke. Specifically, the engine-output control execution unit 52 keeps both the intake valve 17 and the exhaust valve 18 in the closed state. The spark plug 15 generates a spark when the piston 30 slides up to a point close to the top dead center (that is, the combustion stroke is started) while keeping both the intake valve 17 and the exhaust valve 18 in the closed state. The air-fuel mixture in the combustion chamber 12 is combusted and is turned into the combustion gas. Since the combustion gas increases in its volume and the pressure in the combustion chamber 12 increases, the piston 30 slides down from the top dead center toward the bottom dead center. When the piston 30 slides down to a point close to the bottom dead center (the crank angle at 540°), the engine-output control execution unit 52 completes the combustion stroke.

Upon completion of the combustion stroke, the engine-output control execution unit 52 starts the exhaust stroke. Specifically, when the piston 30 slides down to a point close to the bottom dead center (that is, the exhaust stroke is started), the engine-output control execution unit 52 controls the valve drive system so that the exhaust valve 18 is opened. The combustion gas in the combustion chamber 12 is discharged into the exhaust port 13. When the combustion gas is discharged into the exhaust port 13, the engine-output control execution unit 52 controls the valve drive system to close the exhaust valve 18, so that the exhaust stroke is completed. When the exhaust stroke is completed, the engine-output control execution unit 52 executes the intake stroke selected by the mode selection unit 51.

In the case where the heat recovery mode is selected by the mode selection unit 51, the heat-recovery control execution unit 53 repeatedly executes one cycle comprised of "the intake stroke", "a heat-recovery-mode combustion stroke", "a combustion gas holding stroke", and "the exhaust stroke" in this order.

Figure 6:
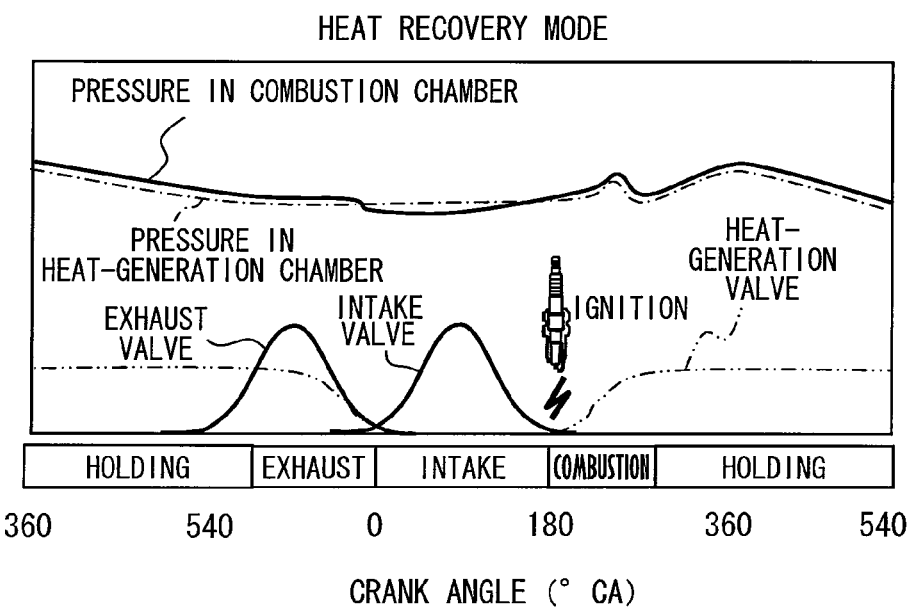
FIG. 6 is an operation view showing transitions in pressure inside a combustion chamber and pressure inside the heat-generation chamber in a case where a heat recovery mode is selected.
Figure 7:
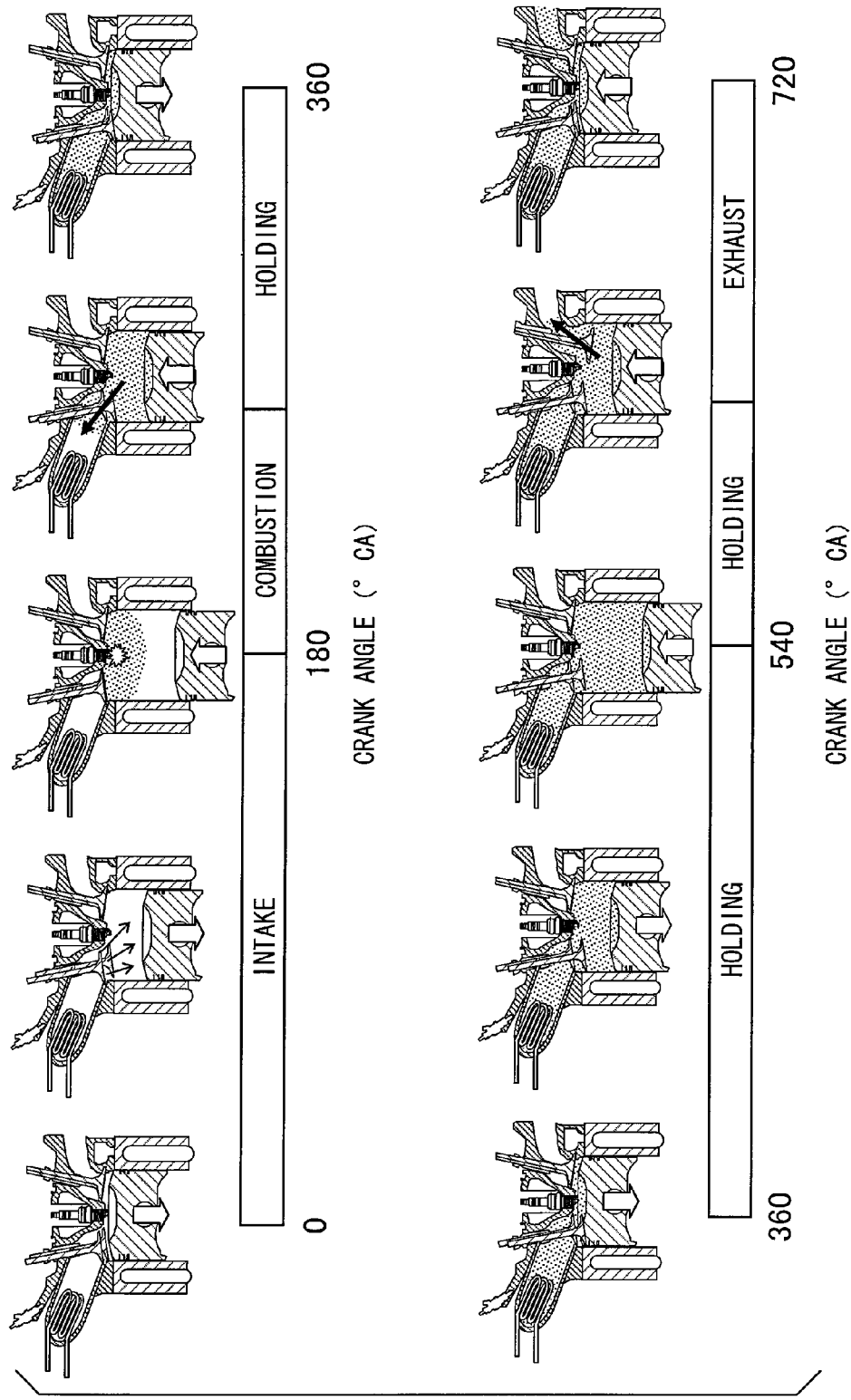
FIG. 7 is an operation view showing transitions in respective states of a piston, an intake valve, an exhaust valve, and a heat-generation chamber valve in a case where the heat recovery mode is selected.

FIG. 6 shows transitions in a pressure in the combustion chamber 12, a pressure in the heat-generation chamber 41, a lift amount of the intake valve 17, a lift amount of the exhaust valve 18, and a lift amount of the heat-generation chamber valve 42, respectively, in a case where the heat recovery mode is selected. FIG. 7 is an operation chart showing transitions in states of the piston 30, the intake valve 17, the exhaust valve 18, and the heat-generation chamber valve 42, in the case where the heat recovery mode is selected. Referring to FIGS. 6 and 7, there is described hereinafter a cycle executed in the heat recovery mode.

As shown in FIGS. 6 and 7, the heat-recovery control execution unit 53 controls the valve drive system to turn the intake valve 17, the exhaust valve 18, and the heat-generation chamber valve 42 into the closed state, thereby starting the intake stroke. When the intake stroke is stared, the piston 30 slides down and the heat-recovery control execution unit 53 controls the valve drive system to open the intake valve 17. The air-fuel mixture in the intake port 11 is introduced into the combustion chamber 12. When the air-fuel mixture is taken into the combustion chamber 12 and the piston 30 slides down to a point close to the bottom dead center (the crank angle at 180°), the heat-recovery control execution unit 53 controls the valve drive system to close the intake valve 17, thereby completing the intake stroke.

After the intake stroke is completed, the heat-recovery control execution unit 53 starts the heat-recovery-mode combustion stroke. Specifically, the heat-recovery control execution unit 53 controls the valve drive system to keep the intake valve 17, the exhaust valve 18, and the heat-generation chamber valve 42 in the closed state. Then, when the piston 30 slides down to a point close to the bottom dead center (that is, the heat-recovery-mode combustion stroke is started), the heat-recovery control execution unit 53 controls the valve drive system to turn the heat-generation chamber valve 42 into an open state and the spark plug 15 generates a spark at this timing. The air-fuel mixture in the combustion chamber 12 is combusted to be combustion gas. Since the heat-generation chamber valve 42 is turned into the open state and the combustion gas expands after the combustion, the combustion gas is introduced into the heat-generation chamber 41. Then, the heat-recovery control execution unit 53 completes the heat-recovery-mode combustion stroke at time when the heat-generation chamber valve 42 is a fully-open state.

After the completion of the heat-recovery-mode combustion stroke, the heat-recovery control execution unit 53 starts the combustion-gas-holding stroke. More specifically, the heat-recovery control execution unit 53 controls the valve drive system to keep the heat-generation chamber valve 42 in the open state, while keeping the intake valve 17 and the exhaust valve 18 in the closed state. Then, when the piston 30 slides up from the bottom dead center to the top dead center (the crank angle at 360°) while both the intake valve 17 and the exhaust valve 18 are kept in the closed state, the combustion gas is compulsorily guided into the heat-generation chamber 41.

A spark is generated by the heat-generation-chamber spark plug 45 at appropriate timing in the combustion-gas-holding stroke. This timing can be, for example, a time point when the combustion-gas-holding stroke is started. However, the timing is not limited thereto, and may be at some midpoint in the combustion-gas-holding stroke. Further, ignition may be executed plural times. Still further, the spark plug 15 may be ignited at the same timing as the heat-generation-chamber spark plug 45 is ignited. Otherwise, the spark plug 15 may generates a spark at some timing in the combustion-gas-holding stroke, differing from the ignition timing of the heat-generation-chamber spark plug 45. Because the combustion gas is held in the heat-generation chamber 41 during the combustion-gas-holding stroke, heat exchange is conducted between the combustion gas in the heat-generation chamber 41 and the heat-recovery water flowing through the heat exchange unit 43b, whereby heat is recovered.

After the combustion gas is compulsorily introduced into the heat-generation chamber 41, the combustion-gas-holding stroke is completed at an appropriate point in time (the crank angle at, for example, 660°) when the piston 30 slides down from the top dead center to the bottom dead center (the crank angle at 540°) and slides up again from the bottom dead center to the top dead center (the crank angle at 720°).

After the completion of the combustion-gas-holding stroke, the heat-recovery control execution unit 53 starts the exhaust stroke. Specifically, the heat-recovery control execution unit 53 controls the valve drive system to keep the heat-generation chamber valve 42 in the open state, while keeping both the intake valve 17 and the exhaust valve 18 in the closed state. Then, the heat-recovery control execution unit 53 controls the valve drive system to open the exhaust valve 18 at such timing when the piston 30 slides down to the point close to the bottom dead center (that is, the exhaust stroke is started). When the exhaust valve 18 is opened, the combustion gas in both the combustion chamber 12 and the heat-generation chamber 41 is discharged into the exhaust port 13. When the combustion gas is discharged into the exhaust port 13 and the piston 30 slides up to the point close to the top dead center (the crank angle at 720° (=0°)), the heat-recovery control execution unit 53 controls the valve drive system to close both the exhaust valve 18 and the heat-generation chamber valve 42, whereby the exhaust stroke is completed. After the completion of the exhaust stroke, the heat-recovery control execution unit 53 executes the intake mode selected by the mode selection unit 51.

Figure 8:
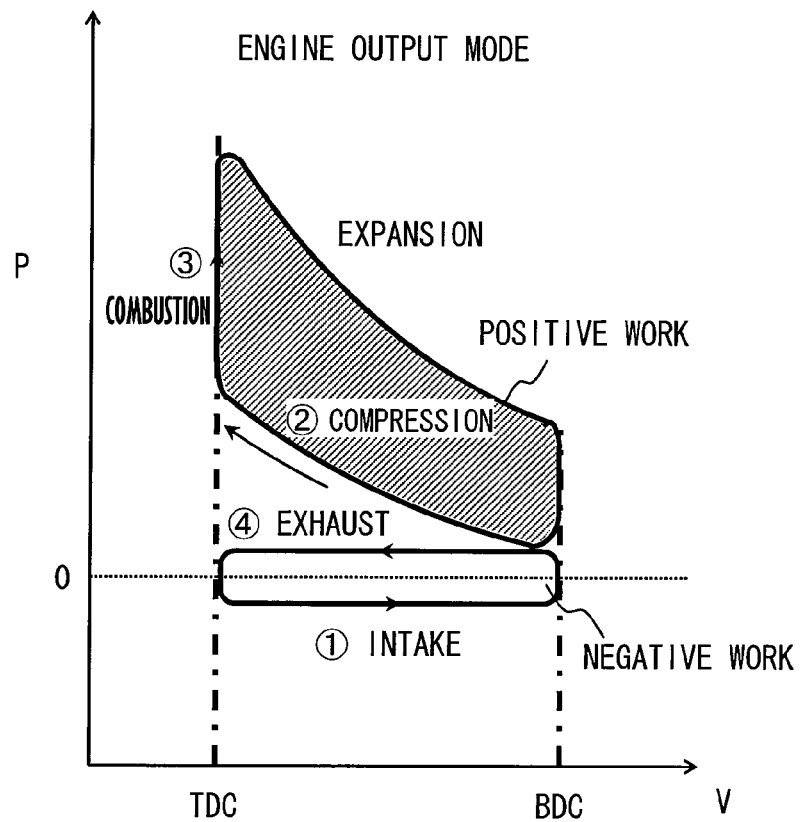
FIG. 8 is a PV diagram in a case where the engine output mode is selected.
Figure 9:
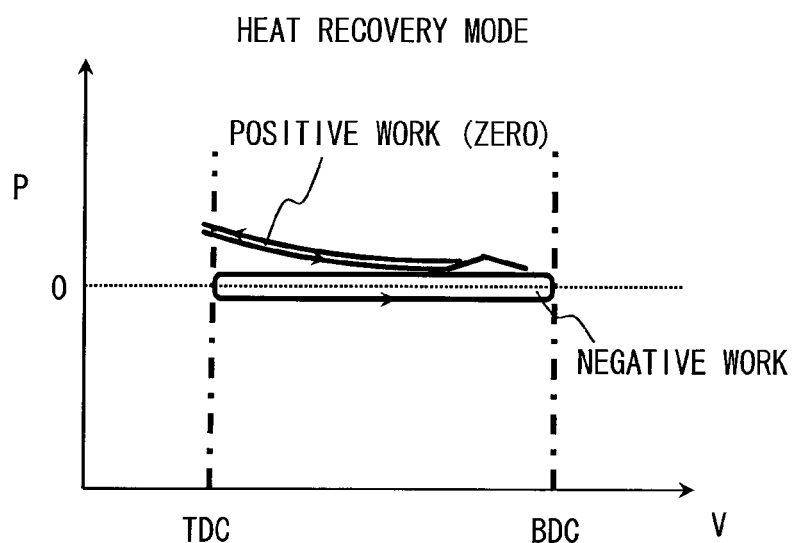
FIG. 9 is a PV diagram in a case where the heat-recovery mode is selected.

FIG. 8 shows a PV diagram in the case where the engine output mode is selected. FIG. 9 shows a PV diagram in the case where the heat-recovery mode is selected.

In the case where the engine output mode is selected, the internal combustion engine 1 executes the Otto-Cycle, so that "positive work" (a shaded part in FIG. 8) can be conducted. The internal combustion engine 1 converts "the positive work" to produce an engine output.

On the other hand, in the case where the heat-recovery mode is selected, the internal combustion engine 1 executes a new cycle as described above, differing from the Otto-Cycle, so that it is hardly possible for the internal combustion engine 1 to execute "positive work" which is substantially zero, as shown in FIG. 9. Because the internal combustion engine 1 hardly executes "the positive work", an engine output can be hardly produced. More specifically, the heat-recovery control execution unit 53 executes the heat-recovery-mode combustion stroke in succession to the intake mode. In the heat-recovery-mode combustion stroke, the heat-generation chamber valve 42 is turned into the open state to combust the air-fuel mixture in the combustion chamber 12. In the heat-recovery-mode combustion stroke, the cylinder slides up and the volume of the combustion chamber 12 is reduced. In the heat-recovery-mode combustion stroke, the heat-generation chamber valve 42 is turned into an open state. The combustion chamber 12 is in a state of communication with the heat-generation chamber 41 to enable the combustion gas to flow from the combustion chamber 12 to the heat-generation chamber 41. Thus, even if the cylinder slides up and the volume of the combustion chamber 12 is reduced, the air-fuel mixture in the combustion chamber 12 is not subjected to so much compression. As a result, a part of thermal energy generated by the combustion of the air-fuel mixture, which will be converted into kinetic energy, is reduced, so that the thermal energy generated by the combustion of the air-fuel mixture can be efficiently recovered through the heat-recovery pipe 43.

Further, the heat-generation chamber 41 is provided with the catalytic unit 46, and heat is generated due to oxidation of the unburned hydrocarbons by the catalytic unit 46. Thus, a recoverable heat quantity can be increased. Further, if the heat-generation-chamber spark plug 45 generates a spark in the combustion-gas-holding stroke, the unburned hydrocarbons in the combustion stroke is combusted and the recoverable heat quantity is further increased.

Figure 10A:
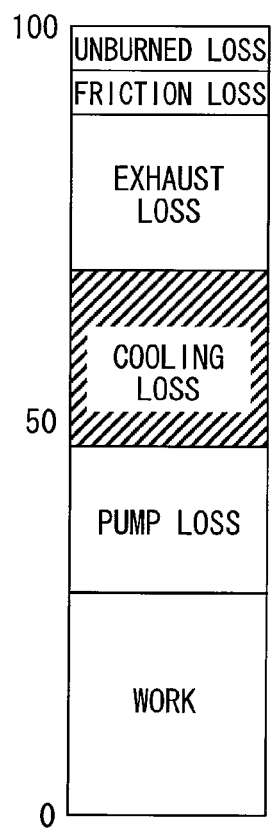
FIG. 10A is a schematic diagram showing respective loss ratio in a case where the engine output mode is selected.
Figure 10B:
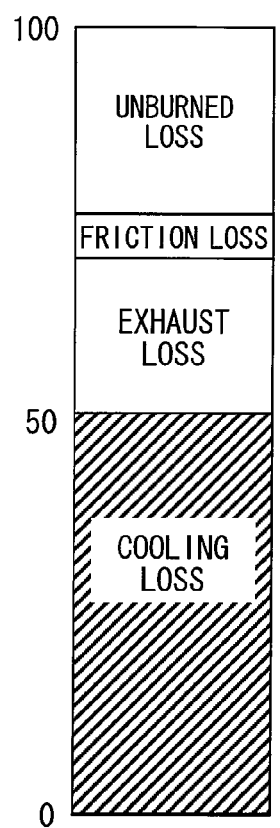
FIGS. 10B and 10C are schematic diagrams showing loss ratio in a case where the heat-recovery mode is selected.
Figure 10C:
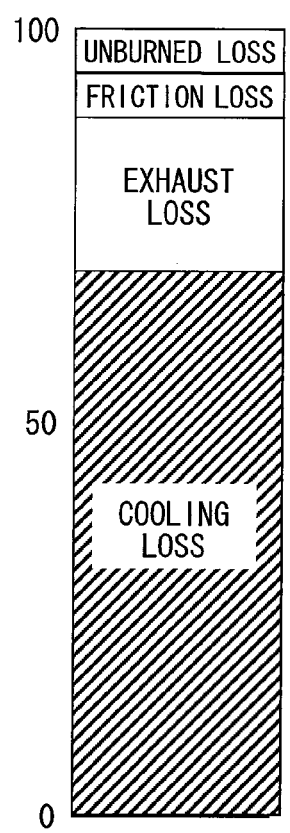

With reference to FIGS. 10A, 10B, 10C and 11, advantages of the internal combustion engine 1 according to the present embodiment are described hereinafter FIGS. 10A, 10B, and 10C show the effect for improving heat recovery efficiency. FIG. 10A is a schematic diagram showing loss ratio in the case where the engine output mode is selected. FIGS. 10B and 10C are schematic diagrams showing loss ratio in the case where the heat-recovery mode is selected. However, FIG. 10C is the schematic diagram showing the respective loss ratio in the case of the internal combustion engine 1 according to the present embodiment. FIG. 10B is intended to indicate the advantageous effect of the catalytic unit 46 by comparing FIG. 10B with FIG. 10C. FIG. 10B indicates the respective loss ratios of the internal combustion engine 1 according to the present embodiment in the case where the heat-recovery mode is executed and the catalytic unit 46 is removed from the internal combustion engine 1.

First, FIG. 10A is compared with FIG. 10B. In either FIG. 10A or FIG. 10B, a chance that the chemical energy of a fuel gas is converted into thermal energy will arise only once when the spark plug 15 is ignited, so that respective ratios of an unburned loss, a frictional loss, and an exhaust loss are substantially on the same order in the case of either the engine output mode or the heat-recovery mode. On the other hand, as to a cooling loss, a pump loss, and a net work, a large difference exists between the respective modes. In the heat-recovery mode, the pump loss, and the net work hardly exist, and these losses correspond to the cooling loss. That is, ratios occupied by the cooling loss, the pump loss, and the net work, respectively, in the case where the engine output mode is selected, is substantially on the same order as a ratio occupied by the cooling loss in the case where the heat-recovery mode is selected.

It is evident from those mentioned as above that the pump loss and the net work, in the case where the engine output mode is selected, are replaced with the cooling loss in the case where the heat-recovery mode is selected. In other words, it is evident that the internal combustion engine 1 according to the present embodiment does not produce an engine output, and the fuel is primarily used for warming up of the internal combustion engine 1 when the heat-recovery mode is selected.

Next, FIG. 10B is compared with FIG. 10C. The respective ratios of the frictional loss and the exhaust loss, shown in FIG. 10B, are substantially the same as those shown in FIG. 10C. However, it is evident that the unburned loss in FIG. 10C is reduced as compared with the unburned loss in FIG. 10B. FIG. 10C represents the case where the catalytic unit 46 is provided. FIG. 10B represents the case where the catalytic unit 46 is not provided. The unburned loss in FIG. 10B is replaced by the cooling loss in FIG. 10C. It is apparent from the comparison of FIG. 10B with FIG. 10C that the heat recovery efficiency has been further enhanced due to the installation of the catalytic unit 46.

Thus, the heat recovery efficiency in the heat-recovery mode is extremely better than that in the engine output mode. For this reason, the internal combustion engine 1 according to the present embodiment can be warmed up at an early stage as compared with the case of an internal combustion engine of the Otto-Cycle. According to the present embodiment, early warm-up can be implemented, so that it becomes possible to improve the fuel economy, reduce hazardous gas and improve its driving comfort.

The present invention is not limited to the embodiments mentioned above, and can be applied to various embodiments.

Figure 11:
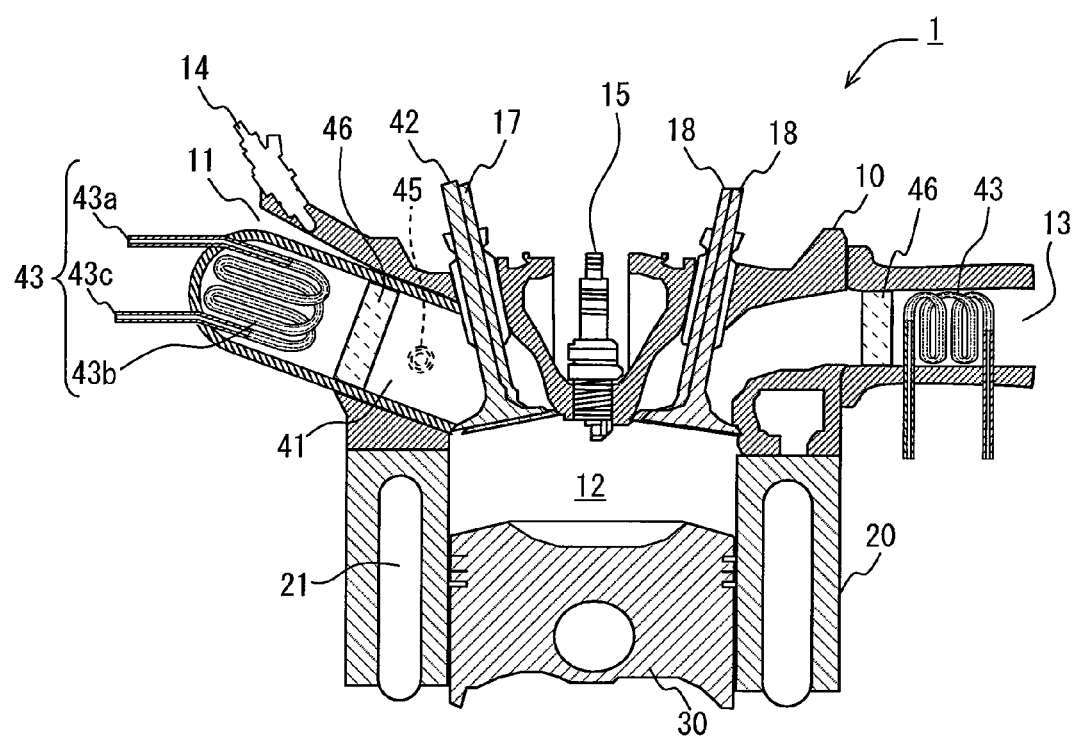
FIG. 11 is cross sectional view showing an engine according to a modification.

For example, the exhaust port 13 may be provided with a heat-recovery pipe 43 and a catalytic unit 46, as shown in FIG. 11. The heat-recovery pipe 43 and the catalytic unit 46 are disposed in the following manner. That is, the catalytic unit 46 is disposed at a part inside of the exhaust port 13 in close to the engine head 10. The heat-recovery pipe 43 is disposed inside of the exhaust port 13, downstream of the catalytic unit 46. Since unburned hydrocarbons are contained in the combustion gas flowing through the exhaust port 13 as well, if the exhaust port 13 is provided with the heat-recovery pipe 43 and the catalytic unit 46, as described above, the unburned hydrocarbons can be oxidized in the exhaust port 13 to generate heat, which can be recovered.

Accordingly, if a configuration depicted in FIG. 11 is adopted, while heat can be recovered in the heat-generation chamber 41 by use of the heat-recovery pipe 43 provided in the heat-generation chamber 41, heat can be recovered in the exhaust port 13 by use of the heat-recovery pipe 43 provided in the exhaust port 13. Further, heat in the combustion chamber 12 can be recovered by the water jacket 21. Accordingly, heat can be recovered in a wide range of the internal combustion engine 1. In other words, it can be said that heat can be recovered in the combustion stroke, the combustion-gas-holding stroke, and the exhaust stroke, respectively. That is, it is possible to efficiently recover heat over a relatively long span during one cycle of the internal combustion engine. With the configuration depicted in FIG. 11, there are provided two units of the catalytic units 46, however, either one of the catalytic units 46 can be dispensed with.

With the embodiment described above, the heat-generation chamber 41 is installed so as to be adjacent to the intake port 11. However, the heat-generation chamber 41 may be installed so as to be adjacent to the exhaust port 13. In this case, the heat-generation chamber 41 is provided with the heat-recovery pipe 43 and the catalytic unit 46.

Further, in the embodiment described as above, the internal combustion engine 1 is provided with the plural cylinders, as shown in FIG. 1, and the cylinders are provided with the heat-generation chamber 41, the heat-generation chamber valve 42, and the heat-recovery pipe 43. However, the invention is not limited to this configuration. Even in the case where the internal combustion engine is provided with the multiple cylinders, the heat-generation chamber 41, the heat-generation chamber valve 42, and the heat-recovery pipe 43 may be installed only in a part of theses cylinders, for example, only in one cylinder thereof.

Figure 12:
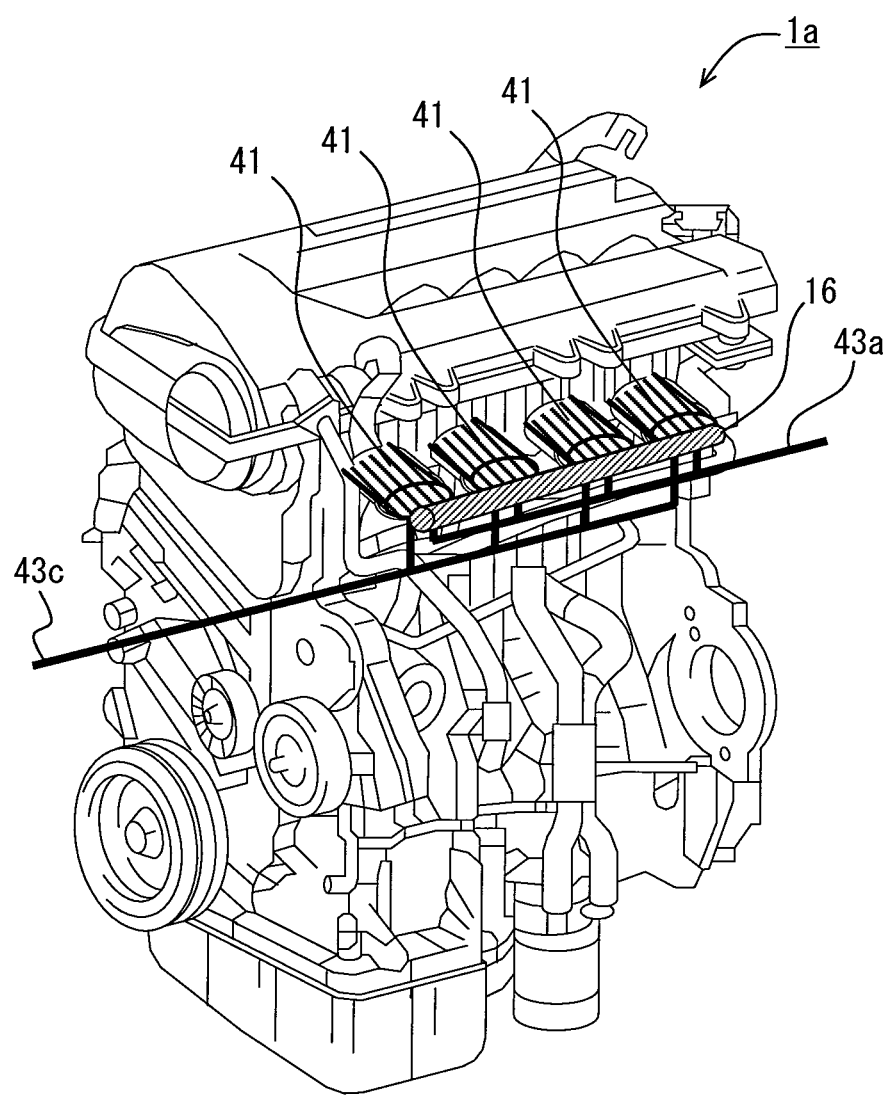
FIG. 12 is a perspective view schematically showing a general construction of the internal combustion engine according to the other modification.

Further, as shown in FIG. 12, the heat-generation chamber 41, the heat-generation chamber valve 42, and the heat-recovery pipe 43 may be provided to each of the plural cylinders, and the plural heat-generation chambers 41 may be interconnected with each other via a communicating pipe 16. The air-fuel mixture can flow between the respective heat-generation chambers 41 via the communicating pipe 16, so that discharge of air-fuel mixture residue in the heat-generation chamber 41 can be promoted. Further, the heat-generation chambers 41 of all the cylinders of the plural cylinders provided with the heat-generation chamber 41, the heat-generation chamber valve 42, and the heat-recovery pipe 43, respectively, need not be connected with each other via the communicating pipe 16. It is sufficient for the heat-generation chambers 41 of at least two cylinders among the plural cylinders provided with the heat-generation chamber 41, the heat-generation chamber valve 42, and the heat-recovery pipe 43, respectively, to be connected with each other via the communicating pipe 16.

In the embodiment described as above, when the heat-recovery mode is selected, the plug 15 generates a spark at timing when the piston 30 comes to the point close to the bottom dead center (the crank angle at 180°). However, the timing for generating the spark is not limited thereto. It is sufficient that the plug 15 generates a spark at timing earlier than the timing in the engine output mode.

Further, in the heat recovery mode described in the foregoing, the one cycle is comprised of "the intake stroke", "the heat-recovery-mode combustion stroke", "the combustion-gas-holding stroke", and "the exhaust stroke" in this order. However, the one cycle may be comprised of "the intake stroke", "an air-fuel mixture inflow stroke", "a heat-generation chamber combustion stroke", "the combustion-gas-holding stroke", and "the exhaust stroke" in this order. In this cycle, the ECU 50 executes the air-fuel mixture inflow stroke for turning the heat-generation chamber valve 42 into an open state in succession to the intake stroke, and causing the air-fuel mixture in the combustion chamber 12 to flow into the heat-generation chamber 41. Subsequently, the ECU executes the heat-generation chamber combustion stroke for causing the heat-generation-chamber spark plug 45 to generate a spark to combust the air-fuel mixture in the heat-generation chamber 41. In a combustion-gas-holding stroke until the exhaust stroke is started, the heat-generation chamber valve 42 is opened. When the exhaust stroke is completed, the heat-generation chamber valve 42 is closed.

In the heat-generation chamber combustion stroke, the piston 30 slides up and the volume of the combustion chamber 12 is reduced. However, in the air-fuel mixture inflow stroke, the air fuel mixture flows from the combustion chamber 12 to the heat-generation chamber 41, and the ignition of the air fuel mixture is executed in the heat-generation chamber 41. For this reason, even if the piston 30 slides up and the volume of the combustion chamber 12 is reduced, a gas in the heat-generation chamber 41 is less subjected to compression. As a result, a part of thermal energy generated by combustion of the air-fuel mixture, which will be converted into kinetic energy, is reduced, so that the thermal energy can be efficiently recovered in the form of heat by the heat-recovery unit.

Further, the heat-generation chamber valve 42 may be normally closed in the heat recovery mode. A thermal reactor may be substituted for the catalytic unit 46.

What is claimed is:

1. An internal combustion engine comprising:
    a cylinder;
    a piston reciprocatively movable in the cylinder;
    a power output unit coupled to the piston, for outputting kinetic energy due to a reciprocating motion of the piston;
    a combustion chamber defined by the cylinder and the piston, in which an air-fuel mixture is combusted;
    a spark plug disposed in the combustion chamber, for generating a spark in order to ignite the air-fuel mixture;
    an intake valve provided between the combustion chamber and an intake port for guiding air into the combustion chamber; and
    an exhaust valve provided between the combustion chamber and an exhaust port for discharging a combustion gas of the air-fuel mixture in the combustion chamber, the internal combustion engine further comprising:
    a heat-generation chamber provided so as to be adjacent to the combustion chamber;
    a heat-generation chamber valve capable of setting up either a communicating state or a shut-down state between the heat-generation chamber and the combustion chamber;
    a heat-generation-chamber heat-recovery unit for recovering heat of a gas introduced into the heat-generation chamber to utilize the heat for warming up;
    a HC purification unit for oxidizing hydrocarbons contained in the combustion gas, and
    a HC purification unit heat-recovery unit provided so as to be adjacent to the HC purification unit, for conducting a heat exchange between a heat generated due to the oxidation of the combustion gas in the HC purification unit and a heat of an engine cooling water, thereby recovering heat generated in the HC purification unit; wherein:
    a heat-generation-chamber spark plug for igniting the air-fuel mixture in the heat-generation chamber is disposed in the heat-generation chamber;
    the HC purification unit is disposed at a position in the heat-generation chamber, away from the heat-generation chamber valve, further than the heat-generation-chamber spark plug; and
    the heat-generation-chamber heat-recovery unit executes a heat recovery at a position away from the heat-generation chamber valve, which is further far from the HC purification unit.

2. The internal combustion engine according to claim 1, wherein:
    the HC purification unit is provided in the heat-generation chamber; and
    structure functioning as the heat-generation-chamber heat-recovery unit also functions as the HC purification unit heat-recovery unit.

3. The internal combustion engine according to claim 1, wherein
    another HC purification unit is provided in the exhaust port; and
    another heat-generation-chamber heat-recovery unit is provided at a position downstream of the another HC purification unit in such a manner as to be adjacent to the another HC purification unit.

4. The internal combustion engine according to claim 1, wherein:
    in addition to the HC purification unit is provided in the heat-generation chamber, another HC purification unit is also provided in the exhaust port;
    structure functioning as the heat-generation-chamber heat-recovery unit also functions as the HC purification-unit heat-recovery unit corresponding to the HC purification unit in the heat-generation chamber; and
    another HC purification-unit heat-recovery unit for recovering heat generated in the another HC purification unit is provided in such a manner as to be adjacent to the another HC purification unit provided in the exhaust port.

5. The internal combustion engine according claim 1, wherein:
    the internal combustion engine is mounted as a driving power source on a vehicle provided with another driving power source other than the internal combustion engine.

* * * * *